US009812148B2

(12) United States Patent
Bradley et al.

(10) Patent No.: US 9,812,148 B2
(45) Date of Patent: Nov. 7, 2017

(54) ESTIMATION OF NOISE CHARACTERISTICS

(71) Applicant: KNUEDGE, INC., San Diego, CA (US)

(72) Inventors: David C Bradley, La Jolla, CA (US); Yao Morin, San Diego, CA (US)

(73) Assignee: KNUEDGE, INC., San Diego, CA (US)

( * ) Notice: Subject to any disclaimer, the term of this patent is extended or adjusted under 35 U.S.C. 154(b) by 86 days.

(21) Appl. No.: 14/860,999

(22) Filed: Sep. 22, 2015

(65) Prior Publication Data

US 2016/0232919 A1 Aug. 11, 2016

Related U.S. Application Data

(60) Provisional application No. 62/128,212, filed on Mar. 4, 2015, provisional application No. 62/112,791, filed on Feb. 6, 2015.

(51) Int. Cl.
*H04B 15/00* (2006.01)
*G10L 21/0216* (2013.01)
*G10L 21/0264* (2013.01)

(52) U.S. Cl.
CPC ...... *G10L 21/0216* (2013.01); *G10L 21/0264* (2013.01)

(58) Field of Classification Search
CPC .. H04R 3/00; H04R 2430/00; H04R 2430/01; H04R 3/04; H04R 1/30; H04R 1/345; H04R 2201/34; H04R 2460/15; H04R 29/00; H04R 29/008; H04R 3/007; H04R 3/02
USPC .......... 381/317, 71.1, 71.14, 73.1, 94.1–94.9
See application file for complete search history.

(56) References Cited

U.S. PATENT DOCUMENTS 7,424,463 B1 * 9/2008 Napoletani ......... G10L 21/0208 706/20
2006/0257043 A1 * 11/2006 Chiu ......................... G06K 9/40 382/261
2012/0320363 A1 * 12/2012 Goodman ............. G01S 7/4873 356/4.01
2014/0024316 A1 * 1/2014 Wang .................... H04W 16/14 455/67.13
2014/0100832 A1 * 4/2014 Pado ................... G01M 5/0066 703/6
2015/0141069 A1 * 5/2015 Wigren ................. H04W 24/00 455/522

* cited by examiner

*Primary Examiner* — Akelaw Teshale
(74) *Attorney, Agent, or Firm* — Pierce Atwood LLP

(57) ABSTRACT

Devices, systems and methods are disclosed for estimating characteristics of noise included in one-dimensional data. For example, a number of data points associated with noise below each of a plurality of thresholds may be determined to calculate a cumulative distribution function. A probability density function may be derived from the cumulative distribution function. A variance may be calculated from the cumulative distribution function and/or the probability density function. The noise may be modeled using the variance and other characteristics determined from the cumulative distribution function and/or the probability density function.

25 Claims, 13 Drawing Sheets

ESTIMATION OF NOISE CHARACTERISTICS

CROSS-REFERENCE TO RELATED APPLICATION DATA

This application claims priority to U.S. Provisional Patent Application Ser. No. 62/128,212 filed Mar. 4, 2015, in the name of David C. Bradley et al. This application also claims priority to U.S. Provisional Patent Application Ser. No. 62/112,791 filed on Feb. 6, 2015, in the name of David C. Bradley. The above provisional applications are herein incorporated by reference in their entireties.

BACKGROUND

A wide variety of signal processing techniques may be performed to improve and/or process signals. Determining noise characteristics included in a digital waveform may improve the signal processing techniques, such that the signal processing techniques may remove or account for the noise and isolate the signals.

BRIEF DESCRIPTION OF DRAWINGS

For a more complete understanding of the present disclosure, reference is now made to the following description taken in conjunction with the accompanying drawings.

DETAILED DESCRIPTION

Digital waveforms representing audio may include signal portions and noise portions. When noise is relatively large in comparison to the signal, it may be difficult to identify the signal and determine if specific variations of the waveform are valid signal changes or random fluctuations caused by noise. To reduce or remove the noise, signal processing techniques may be used to isolate the signals from the noise based on characteristics of the noise. Typically, the characteristics of the noise are determined in known gaps between peaks of the signals. However, determining the characteristics of the noise may be difficult when the signals are constantly present or in situations when it may be difficult to determine when the signals start and stop. Even when the signal start/stop points are known, isolating the noise data points may be processor intensive. Determining the noise of a waveform is desirable so that noise may be removed from a waveform to focus on the signal portions or to increase the performance of other processing of the waveform.

Offered is an improved noise characteristics estimation system and method. Instead of determining the noise characteristics based on individual data points of a waveform when a signal portion is known to be absent, the noise characteristics may be estimated using thresholds and various signal comparison techniques that do not require a priori knowledge of a signal component of the waveform. For example, data points may be associated with a positive direction (e.g. above the threshold) or a negative direction (e.g., below the threshold) based on fluctuations of the data points. Transitions between the positive direction and the negative direction can be determined and used for noise characteristics estimation. Based on the transitions, a number of positive runs (e.g., sequences of data points above the threshold) and a number of negative runs (e.g., sequences of data points below the threshold) may be determined and used to estimate a number of noise data points that would be below the threshold in the absence of the signal. Using the number of data points associated with the noise below each threshold for a plurality of thresholds, a cumulative distribution function and/or a probability density function may be determined. A variance or other noise characteristics may be determined from the cumulative distribution function and/or the probability density function. Using the noise characteristics, such as the variance, the noise may be modeled and signal processing of the waveform may be improved.

Figure 1:
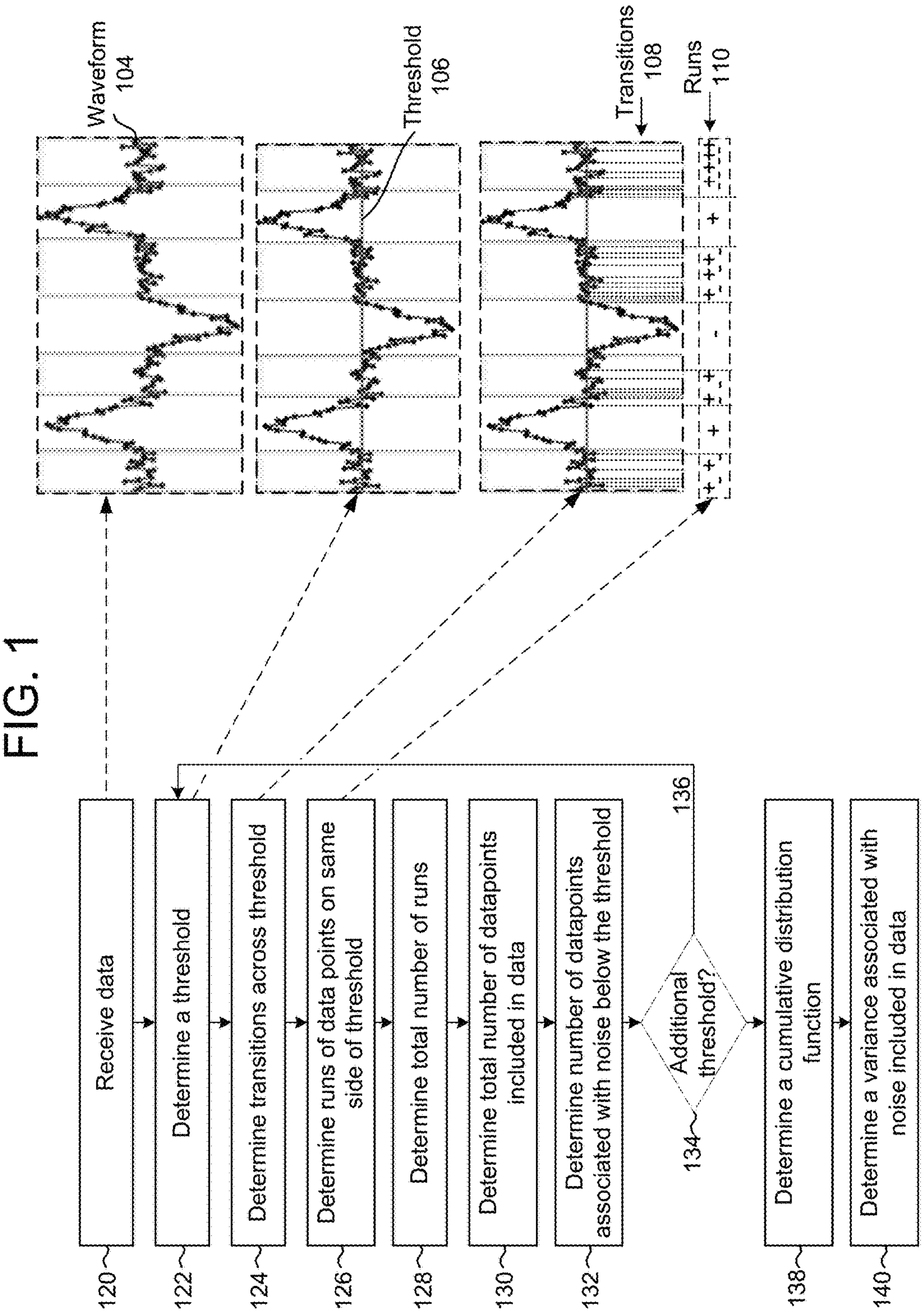
FIG. 1 illustrates an overview of a system for determining characteristics of noise according to embodiments of the present disclosure.

FIG. 1 illustrates an overview of a system 100 for implementing embodiments of the disclosure. As illustrated in FIG. 1, the system 100 may include a device 102 configured to determine noise characteristics for noise included in a waveform (e.g., a string of data points). The noise characteristics (e.g., variance, mean or the like) provides the device 102 with additional information regarding noise included in the data. By simulating the noise, for example using a Gaussian distribution and the variance, the device 102 may identify signals that may be obscured by the noise within the waveform.

As illustrated in FIG. 1, a waveform 104 may include signals and noise. While the noise may result in minor variations of a magnitude of the waveform 104, the device 102 may filter the noise or determine characteristics of the noise to reduce or control for the minor variations. For example, when a magnitude of the signals greatly exceeds a magnitude of the noise, the device 102 may smooth the data or otherwise separate the signals from the noise. However, when a magnitude of the signals is close to a magnitude of the noise, or under other circumstances, the device 102 may not be able to distinguish the signals from the noise and therefore may not be able to determine if a signal is present and/or determine characteristics of the noise. When the signals are not present in the waveform 104, the noise may be roughly centered around a noise mean (i.e., the noise may be positive or negative fluctuations around an average noise value). Therefore, by determining characteristics of the noise included in the waveform 104, the device 102 may estimate characteristics of the noise and improve processing of the signals. As illustrated in FIG. 1, the device 102 may determine the noise characteristics using a threshold 106.

The device 102 may receive (120) data. The data may be one-dimensional data, such as a sequence of single value data points, illustrated as the waveform 104. For example, the data may include audio speech data, audio data, radar data or any one-dimensional data waveform. In some examples, the data may be two-dimensional data (for example, a spectrogram or an image) and the device 102 may identify one-dimensional cross sections of the data to analyze or may process in two dimensions. The data may be two-dimensional without departing from the present disclosure. Further, the data may be associated with a time domain or a frequency domain without departing from the present disclosure.

To determine the noise characteristics of noise included in the data, the device 102 may determine (122) a threshold. The threshold is a constant value used as a reference point to compare to the data. The device 102 may determine (124) transitions in the data relative to the threshold, such as when neighboring data points cross the threshold. The transitions occur when one point of the data is above the threshold and a next point of the data is below the threshold (or vice versa), thus resulting in the data "crossing" the threshold. The device 102 may determine (126) runs in the data based on the transitions. For example, a positive run may be a first series of sequential data points where the data exceeds the threshold (and does not cross the threshold) and a negative run may be a second series of sequential data points where the data is below the threshold (and does not cross the threshold). The runs may be separated by the transitions, as explained in further detail below. The device 102 may determine (128) a total number of runs based on the transitions. For example, the total number of runs may be equal to the number of transitions plus one.

The device 102 may determine (130) a total number of data points included in the data. The device 102 may then determine (132) an estimate of the number of data points associated with noise that would be below the first threshold in the absence of the signal. For example, the device 102 may determine a number of data points that are included in negative runs (e.g., below the threshold) using the total number of data points and the total number of runs, as discussed in greater detail below.

The device 102 may determine (134) if there is an additional threshold. For example, the device 102 may sweep from a bottom to a top of a data range associated with a waveform in small increments, generating a threshold at each level. If there is an additional threshold (e.g., a threshold a small increment above the current threshold), the device 102 may loop (136) to step 122 and repeat steps 122-134. If there isn't an additional threshold (e.g., the current threshold is at the top of the data range), the device 102 may determine (138) a cumulative distribution function using the results of steps 128-132 for individual thresholds. For example, the cumulative distribution function may be determined from a plurality of individual thresholds, using the total number of runs associated with the individual threshold for each of the plurality of thresholds. The device 102 may then determine (140) a variance associated with noise included in the data using the cumulative distribution function. In some examples, the device 102 may determine the variance directly from the cumulative distribution function. In other examples, the device 102 may determine the variance by calculating a derivative of the cumulative distribution function to determine a probability density for the data, as will be discussed in greater detail below with regard to FIG. 11A.

To alternate between the time domain and the frequency domain, the device 102 may analyze a Fast Fourier Transform (FFT) of a waveform. However, instead of using a magnitude of the FFT, the device 102 may ignore imaginary components and only use real components of the FFT (or vice versa or process both real and imaginary components). The waveform may be processed in either the time domain or the frequency domain as the FFT may not change properties of the waveform for present purposes.

Further, the device 102 may analyze other transformations of waveforms, such as a transformation from the time domain to a frequency-chirp domain or a frequency-fractional chirp rate domain. For example, data may be input in the time domain and transformed to another domain prior to determining the threshold in step 122. At step 124, the transitions across the threshold may be determined using the transformed data. The transformation may result in a multi-dimensional representation of the audio. This representation, or "space," may have a domain given by frequency and chirp rate or fractional chirp rate. Transforming audio signals into a frequency-chirp domain is described in more detail in U.S. Pat. No. 8,548,803 filed Aug. 8, 2011 and issued on Oct. 1, 2013 and entitled "System and method of processing a sound signal including transforming the sound signal into a frequency-chirp domain," and U.S. Pat. No. 8,767,978 filed Aug. 8, 2011 and issued on Jul. 1, 2014 and entitled "System and method for processing sound signals implementing a spectral motion transform." These two patents are herein incorporated by reference in their entireties. The representation may have a co-domain (output) given by the transform coefficient. As such, a transformed signal portion may specify a transform coefficient as a function of frequency and chirp rate or fractional chirp rate for a time sample window associated with the transformed waveform portion. Instead of using a magnitude of the transformed waveform portion, the device 102 may ignore imaginary components and only use real components of the transformed waveform portion (or vice versa or process both real and imaginary components).

Figure 2:
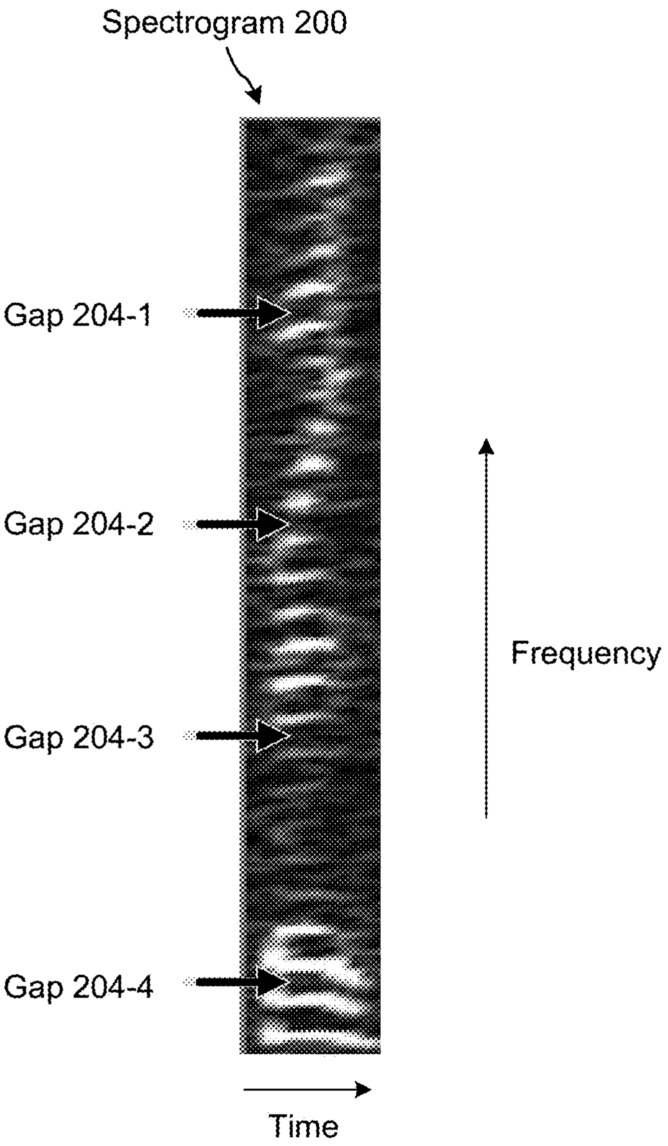
FIG. 2 illustrates an example of a spectrogram of a waveform.

In some examples, the data received by the device 102 may be a waveform that specifies signal as a function of time. For example, a waveform may have a sampling rate at which amplitude is represented. The sampling rate may correspond to a sampling period. The waveform may be represented, for example, in a spectrogram. By way of illustration, FIG. 2 depicts a spectrogram 200 in a time-frequency domain. The spectrogram 200 may be determined as the magnitude squared of a corresponding short-time Fourier transform. The spectrogram 200 may be two-dimensional, extending in a vertical frequency dimension and a horizontal time dimension (or vice versa). In addition, amplitude may be the third dimension, and may be represented as color (e.g., the lighter color, the greater the amplitude). To determine noise characteristics associated with noise present in the waveform, the device 102 may process one-dimensional or two-dimensional portions of a short-time Fourier transform (corresponding to spectrogram 200).

As illustrated in FIG. 2, the spectrogram 200 may include signals along with gaps 204 between the signals. For example, the spectrogram 200 may include a first gap 204-1, a second gap 204-2, a third gap 204-3 and a fourth gap 204-4. In a sound signal, contributions attributable to a single sound and/or source may be arranged at harmonic (e.g., regularly spaced) intervals in the frequency domain. These spaced apart contributions to the sound signal may be referred to as "harmonics" or "overtones." The spacing between a given set of overtones corresponding to a sound at a point in time may be referred to as the "pitch" of the sound at that point in time. For example, the spectrogram 200 is a first set of overtones associated with a first sound and/or source. While not illustrated in FIG. 2, there may be an additional spectrogram (e.g., a second set of overtones associated with a second sound and/or source) spaced apart from the spectrogram 200 in the time domain. The first sound and the second sound may have been generated by a common source, or by separate sources.

Figure 3A:
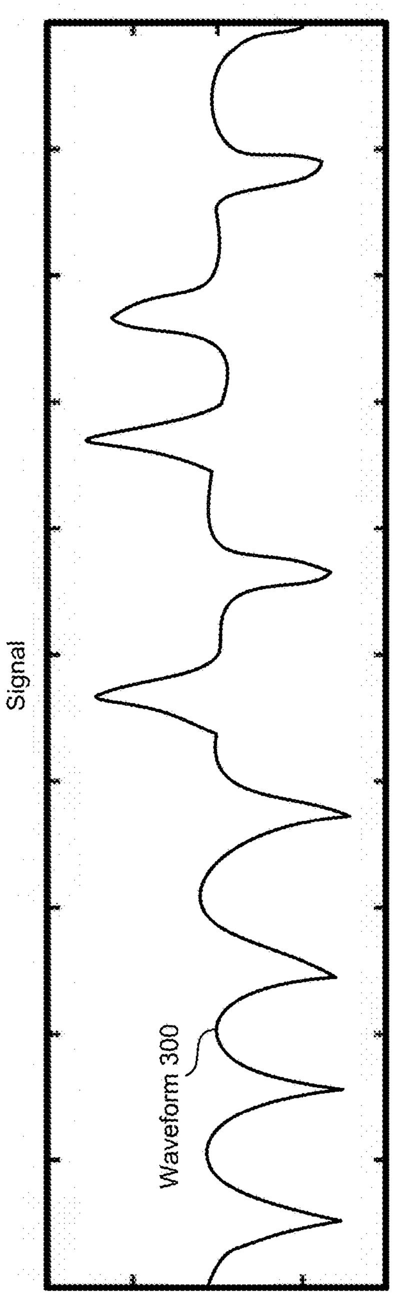
FIGS. 3A-3B illustrates examples of waveforms including a signal and both a signal and noise.
Figure 3B:
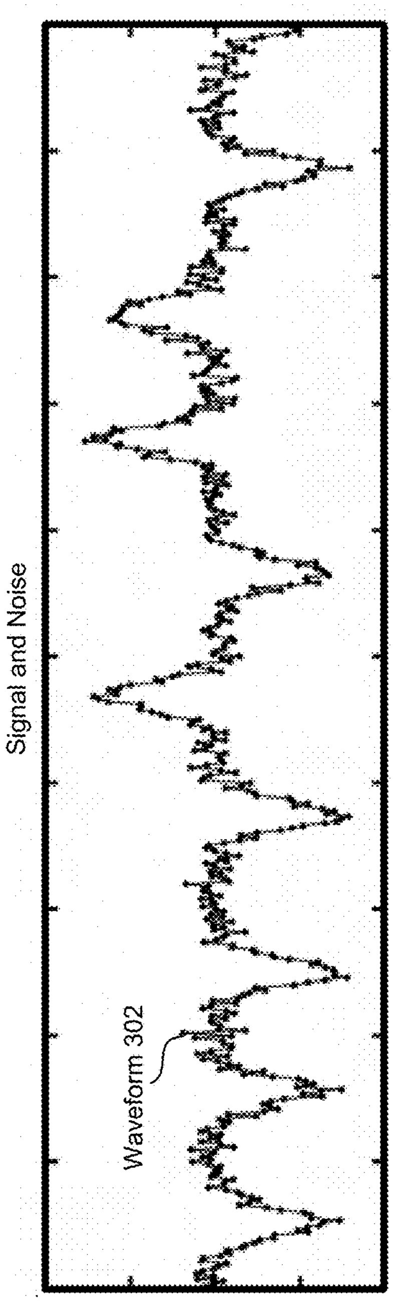

FIG. 3A illustrates an example of a one-dimensional waveform. As illustrated in FIG. 3A, a first waveform 300 includes an idealized signal without noise. In contrast to the first waveform 300 illustrated in FIG. 3A, FIG. 3B illustrates a second waveform 302 including a signal having some level of noise, which may be, for example, an independent and identically distributed sequence (i.i.d.) summed with the signal. The noise is centered around a mean and affects a magnitude of the second waveform 302. For example, a magnitude of the noise may be equal to a difference between a magnitude of the second waveform 302 and a magnitude of the first waveform 300.

When data includes noise, it may be difficult to process the data, for example to recognize speech in a speech waveform. When the characteristics of the noise are known or estimated, the processing of the waveform may be improved. For example, the speech recognition algorithm may use estimated noise characteristics to improve the accuracy of the speech recognition output. The following description is focused on determining the noise characteristics.

Figure 4:
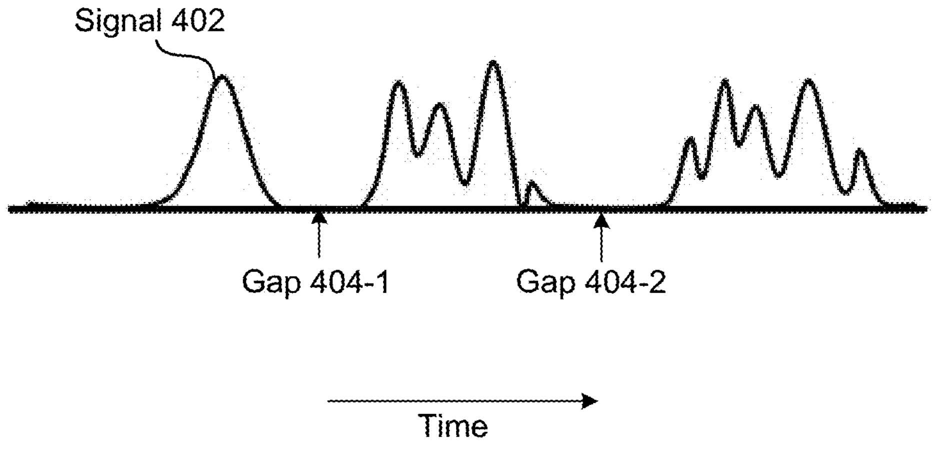
FIG. 4 illustrates an example of gaps within a signal.

Typically, noise characteristics are determined by identifying gaps within a signal and determining the noise characteristics of data within the gaps. For example, FIG. 4 illustrates a signal 402 including gaps within the signal 402. As illustrated in FIG. 4, the signal 402 may include a first gap 404-1 and a second gap 404-2. However, determining gaps within the signal may be difficult as the beginning and end of the gaps may be obscured by the noise. Therefore, the noise characteristics may be determined in part on data associated with the signal 402 and the noise may not be modeled properly.

To properly model the noise characteristics for a waveform that also includes data associated with a signal, the device 102 may determine noise characteristics using a configurable threshold. For example, the device 102 may position the threshold through the waveform from low to high in small increments and determine a number of positive runs (e.g., sequences of data points above the threshold) and a number of negative runs (e.g., sequences of data points below the threshold) for each position of the threshold. A run includes a consecutive sequence of data points above or below the threshold, such that a sequence of data points associated with the signal (e.g., peaks or valleys) on one side of the threshold (without crossing the threshold) results in a single run. The device 102 may then determine a number of data points below the threshold for each position of the threshold and therefore determine a cumulative distribution function of the noise.

The device 102 may determine noise characteristics from all data points included in the data or only data points included in smaller portions of the data. In some examples, the device 102 may determine overall noise characteristics for the data and may determine a variance and/or mean using the overall noise characteristics. In other examples, the device 102 may determine noise characteristics associated with a range of data points and may therefore have more accurate noise characteristics for the data points included in the range of data points. For example, the device 102 may adjust a time window in the time domain, with a narrow band time window including a relatively narrow range of the data points and a wide band time window including a relatively wider range of the data points. As the narrow band time window includes less data, the estimate of the noise characteristics may be less accurate due to the limited data but have good resolution, meaning the estimate accounts for changes to the noise. In contrast, as the wide band time window includes more data, the estimate of the noise characteristics may be more accurate due to increased amount of data but have poor resolution, meaning the estimate cannot account for changes in the noise within the wide band time window.

Figure 5A:
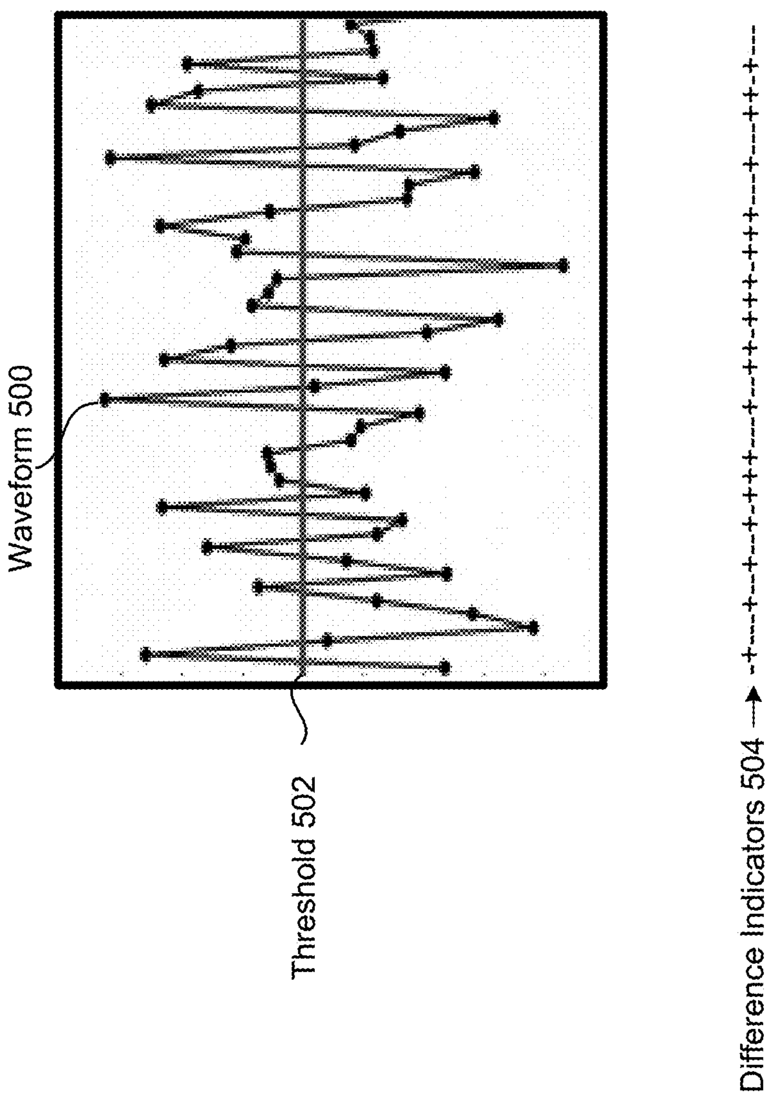
FIGS. 5A-5B illustrates an example of determining runs when signals are not present in a waveform according to embodiments of the present disclosure.

FIG. 5A illustrates an example of a threshold when signals are not present in a waveform 500 (e.g., the waveform is noise) according to embodiments of the present disclosure. As illustrated in FIG. 5A, the device 102 may determine a difference between individual data points included in the waveform 500 and the threshold 502 and may determine if the difference is positive or negative. For example, the device 102 may determine a difference is positive when a data point in the waveform 500 is above the threshold 502 and the device 102 may determine a difference is negative when the data point in the waveform 502 is below the threshold. As illustrated in FIG. 5A, difference indicators 504 illustrate whether individual data points included in the waveform 500 are above or below the threshold 502.

Figure 5B:
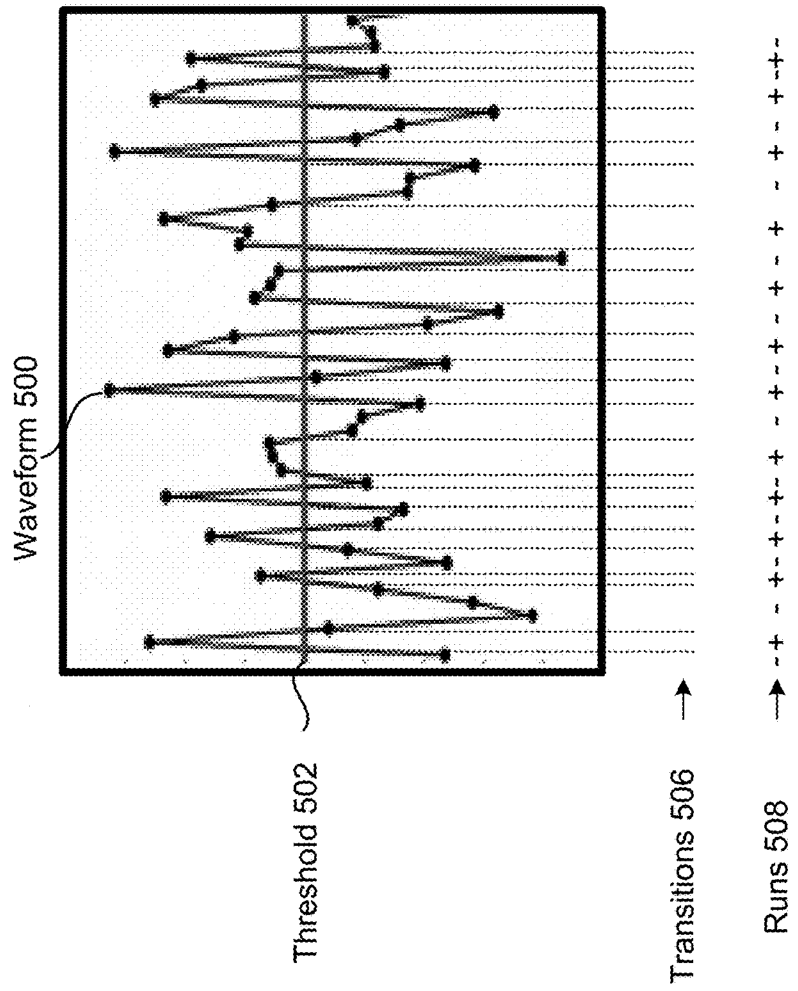

As illustrated in FIG. 5B, after determining the difference indicators 504 the device 102 may determine transitions 506 between positive difference indicators and negative difference indicators. Thus, a transition separates a series of positive difference indicators from a series of negative difference indicators so that each transition roughly corresponds to when the waveform 500 intersects the threshold 502. The device 102 may either determine the transitions using sign changes between neighboring difference indicators 504 or by determining where the waveform 500 intersects the threshold 502. In some examples, the device 102 may determine runs 508 by determining the transitions 506. For example, as the transitions 506 separate the runs 508, there is one more run 508 than transition 506 and the device 102 may determine a total number of runs by adding one to a total number of transitions. Additionally or alternatively, the device 102 may determine the total number of runs by simply counting the number of runs. In addition, the device 102 may determine a number of positive runs by determining if data points between two transitions are above the threshold 502 and may determine a number of negative runs by determining if data points between two transitions are below the threshold 502. As the waveform 500 illustrated in FIG. 5B includes random noise and not a signal, the random noise fluctuates around the threshold 502 with frequent transitions between positive runs and negative runs.

Figure 6A:
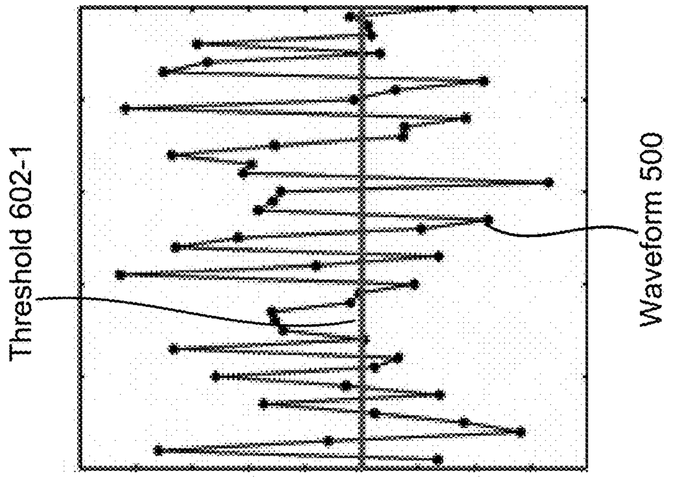
FIGS. 6A-6C illustrate examples of different thresholds when signals are not present according to embodiments of the present disclosure.
Figure 6B:
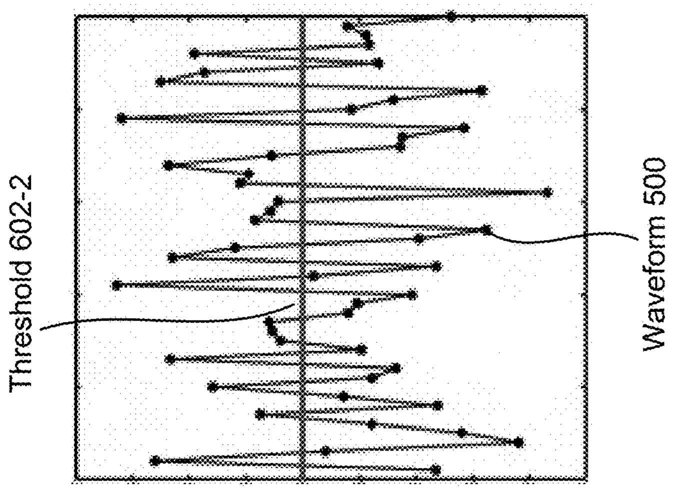
Figure 6C:
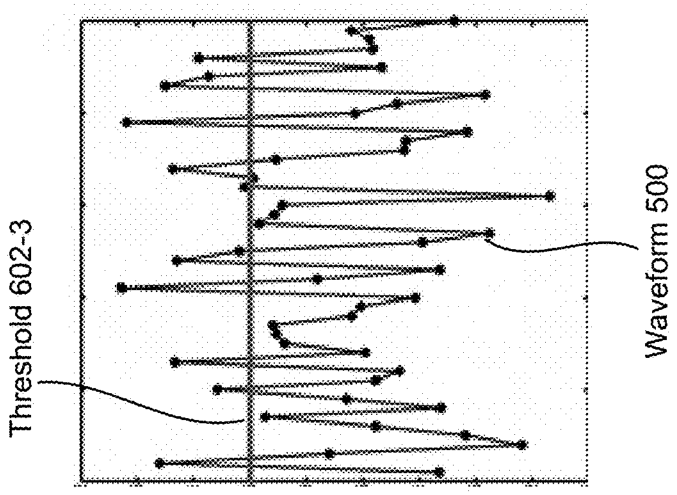

The device 102 may sweep from a bottom to a top of a data range associated with a waveform in small increments, generating a threshold at each level. For each threshold level, the device 102 determines a number of runs above and below the threshold. Therefore, the device 102 may determine a number of positive runs, a number of negative runs and a total number of runs for each threshold level. For example, FIG. 6A illustrates a first threshold 602-1 having a greater number of positive data points than negative data points, resulting in positive runs being relatively longer than negative runs, FIG. 6B illustrates a second threshold 602-2 having a similar number of positive data points and negative data points and FIG. 6C illustrates a third threshold 602-3 having a greater number of negative data points than positive data points, resulting in negative runs being relatively longer than positive runs. As the threshold 602 goes from low to high, the number of runs changes. Initially there are a relatively small number of runs as the threshold 602 is below a majority of the negative peaks in the waveform 500. As the threshold moves closer to the mean of the noise, the waveform 500 crosses the threshold 602 more frequently and the number of runs increases. At approximately the noise mean, which may be illustrated as the second threshold 602-2, the number of runs reaches a maximum. As the threshold moves further from the mean, such as the third threshold 602-3, the number of runs decreases until finally there is a relatively small number of runs. Thus, the device 102 may sweep through the waveform 500 and determine a total number of runs for individual threshold levels, with the number of runs reaching a maximum near the noise mean.

Figure 7:
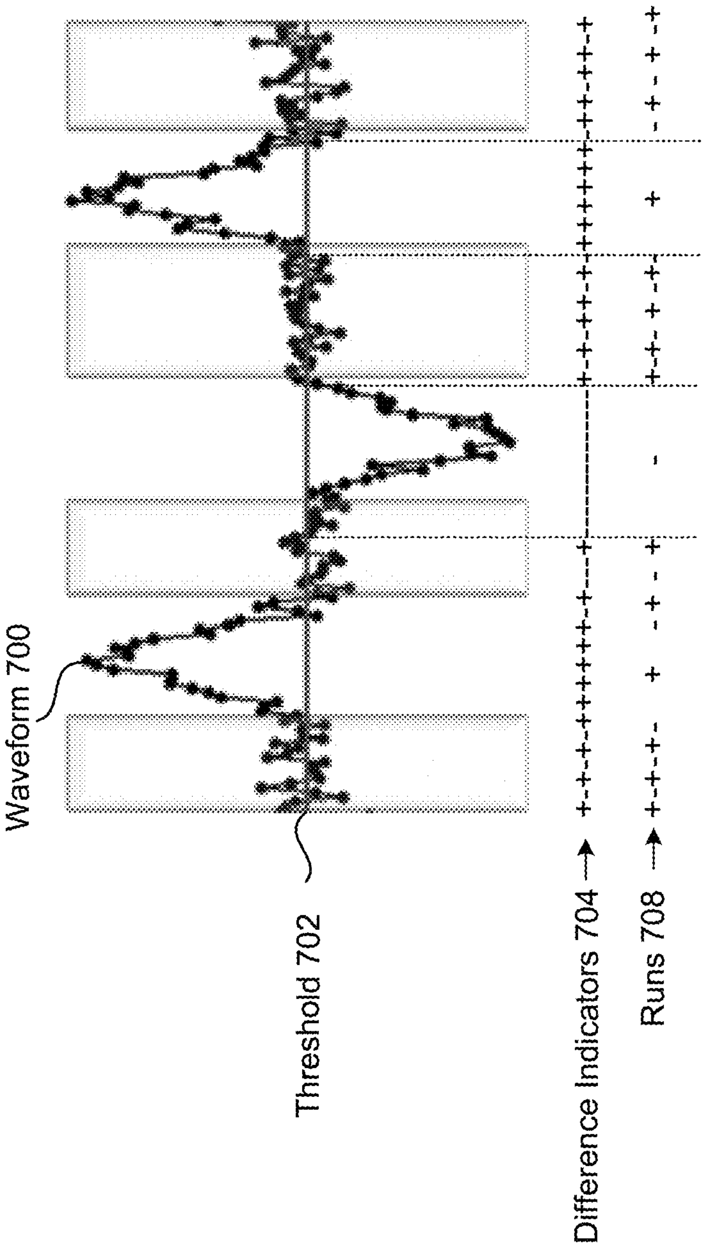
FIG. 7 illustrates an example of a threshold when signals are present in a waveform according to embodiments of the present disclosure.

While the waveform 500 illustrated in FIGS. 5A-6C includes random noise and not a signal, the device 102 may determine noise characteristics using the same technique when a signal is present. For example, FIG. 7 illustrates an example of a threshold when a signal is present in a waveform according to embodiments of the present disclosure. As illustrated by difference indicators 704 in FIG. 7, the device 102 may determine a difference between a data point included in the waveform 700 and a threshold 702 and may determine if the difference is positive or negative. For example, the device 102 may determine a difference is positive when a data point in the waveform 700 is above the threshold 702 and the device 102 may determine a difference is negative when a data point in the waveform 702 is below the threshold 702. Using the difference indicators 704, or by determining transitions where the waveform 700 intersects the threshold 702, the device 102 may determine runs 708. The device 102 may sweep through the waveform 700 and determine a total number of runs for individual threshold levels, with the number of runs reaching a maximum near the noise mean.

While the signal is present in the waveform 700, FIG. 7 illustrates how the signal does not greatly impact the determination of the noise characteristics. As an example, if the device 102 determined the variance of the waveform 700 by determining a number of positive data points included in the waveform 700 above the threshold 702 and a number of negative data points included in the waveform 700 below the threshold 702, the presence of the signal would impact the estimated noise characteristics. For example, data points included in the two positive peaks in the waveform 700 (associated with the signal) outnumber data points included in the negative peak in the waveform 700, so a corresponding noise mean estimate would be biased in a positive direction above the threshold 702 and characteristics of the waveform 700 wouldn't correspond to characteristics of the noise.

However, instead of determining an absolute total number of positive data points (e.g., data points above the threshold 702) and an absolute total number of negative data points (e.g., data points below the threshold 702), the device 102 determines the runs 708. As a result, when the signal is present (e.g., the two positive peaks and the negative peak) in the waveform 700, the device 102 groups data points associated with the signal into runs. For example, the negative peak corresponds to first run 708-1 and the second positive peak corresponds to second run 708-2. While noise is present along with the signal during first run 708-1 and second run 708-2, the device does not require a priori knowledge of what portion of the waveform corresponds to signal or noise.

Figure 8A:
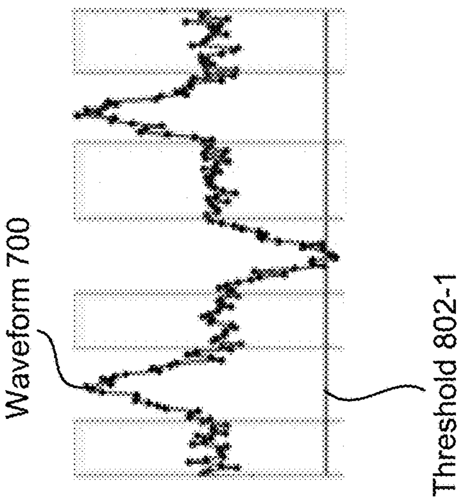
FIGS. 8A-8C illustrate examples of different thresholds when signals are present according to embodiments of the present disclosure.
Figure 8B:
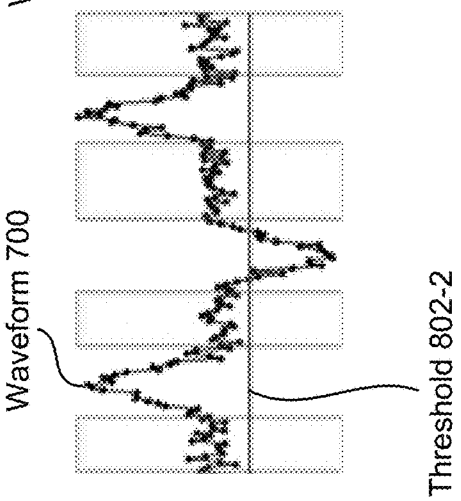
Figure 8C:
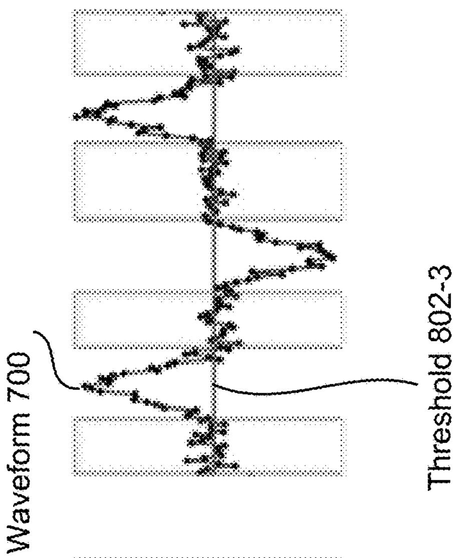

As described above, the device 102 may sweep through the waveform 700 and determine a total number of runs for individual threshold levels, with the number of runs reaching a maximum near the noise mean. The device 102 may determine a cumulative distribution function using the total number of runs for individual threshold levels, may estimate a mean of the noise using the cumulative distribution function, and may determine a variance of the noise using the cumulative distribution function. Therefore, the device 102 may determine a number of positive runs and a number of negative runs for multiple thresholds, as illustrated in FIGS. 8A-8C. This process is similar to the process described above in reference to FIGS. 6A-6C.

For example, as the threshold 802 goes from low to high, a number of runs changes. Initially, FIG. 8A illustrates a first threshold 802-1 with only three runs as only the negative peak dips below the first threshold 802-1. The device 102 may determine only three runs for a number of thresholds until the second threshold 802-2 illustrated in FIG. 8B. While the device 102 may not know where gaps in the waveform 700 start and stop, the device 102 may determine that a number of runs increases for the third threshold 802-3 illustrated in FIG. 8C, as the data points in the waveform 700 transition from above to below the third threshold 802-3 more frequently. The data points in the waveform 700 transition from above to below the third threshold 802-3 more frequently because the third threshold 802-3 is within the noise included in the gaps of the waveform 700. Thus, the third threshold 802-3 may be near the noise mean and therefore associated with a maximum number of runs. The device 102 may determine that the number of runs decreases as the threshold moves higher than the noise mean. As discussed above, the device 102 may determine a cumulative distribution function using the number of runs associated with each threshold and may estimate noise characteristics using the cumulative distribution function.

In this example, the third threshold 802-3 may correspond approximately to the noise mean. Noise will have a mean of approximately zero when the distribution of the noise is symmetric about zero, which is typically the case for audio data. If the noise is assumed to have zero mean, the device 102 may determine the mean of the noise by finding a center of the cumulative distribution function (e.g., a point at which the number of data points are symmetric above and below). However, the present disclosure is not limited thereto and the mean of the noise may vary, as discussed in greater detail below. Aside from a few runs associated with each peak of the signal, the signal does not affect the total number of runs. Therefore, in the region near the noise mean, the number of runs, and particularly the gradient of this number relative to a threshold, depends mostly on the noise in gaps within the signal. As a result, the signal does not substantially affect the observed number of runs.

To determine the cumulative distribution function, the device 102 may estimate a number of data points associated with the noise below an individual threshold (in the absence of the signal) based on the number of runs observed at the individual threshold by solving the quadratic equation in Equation 1:

$$\frac{1}{N}B^2 - B + \frac{\rho}{2} = 0 \tag{1}$$

where B is the number of data points associated with the noise below the threshold, N is the total number of data points and p is the observed number of runs. Solving Equation 1 results in two solutions, one solution associated with the number of data points below the threshold and one solution associated with the number of data points above the threshold. Thus, the device 102 may solve Equation 1 for the number of data points below the threshold and ignore the second solution.

After determining the number of data points associated with the noise below the threshold for each of a plurality of thresholds, the device 102 may estimate a cumulative distribution function of the noise using Equation 2:

$$\hat{F}_G(\tau) = \frac{B(\tau)}{2\rho_0} \tag{2}$$

where $\tau$ is a value of the threshold, $\hat{F}_G(\tau)$ is the cumulative distribution function, $B(\tau)$ is the number of data points associated with the noise below the threshold for a given threshold and $\rho_0$ is the observed number of runs at the noise mean (e.g., such as $\tau=0$ if the noise has zero mean). As discussed above, the noise mean may correspond to a maximum number of observed runs. The noise mean may be assumed to be zero, may be known a priori or may be estimated as discussed in greater detail below.

After determining the cumulative distribution function, the device 102 may determine a variance associated with the noise from the cumulative distribution function or may determine a probability density function and determine the variance associated with the noise from the probability function distribution. For example, the device 102 may determine the probability density function by taking a derivative of the cumulative distribution function using Equation 3:

$$f_G(\tau) = \frac{d}{d\tau}\hat{F}_G(\tau) \tag{3}$$

where $f_G(\tau)$ is the probability density function and $\hat{F}_G(\tau)$ is the cumulative distribution function. The noise characteristics, such as mean and variance, may be determined from either $f_G(\tau)$ or $\hat{F}_G(\tau)$.

Figure 9A:
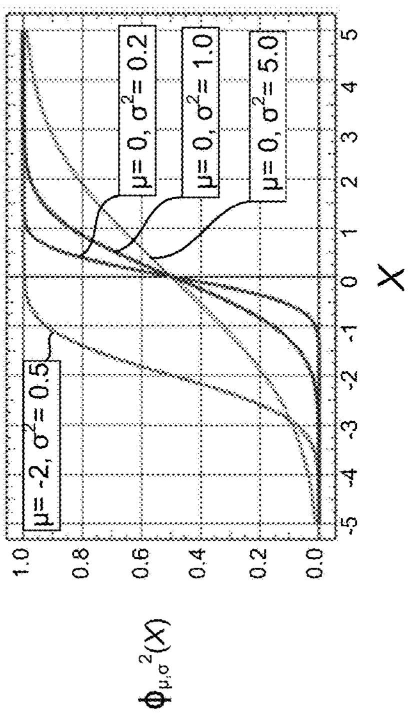
FIGS. 9A-9B illustrate examples of cumulative distribution functions and probability density functions.
Figure 9B:
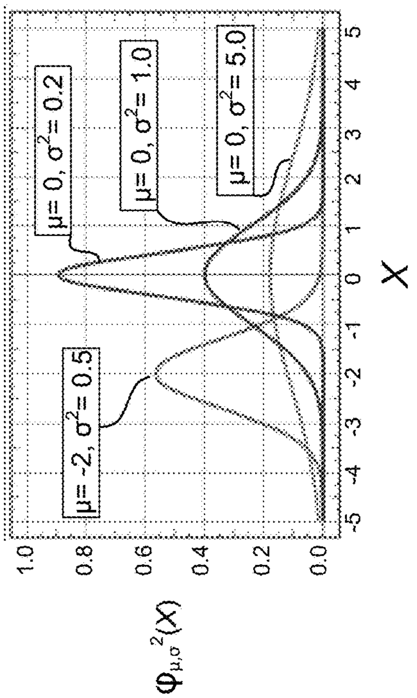

FIG. 9A illustrates an example of cumulative distribution functions (CDFs) while FIG. 9B illustrates examples of probability density functions (PDFs). The cumulative distribution functions describe the probability that a real-valued random variable X with a given probability distribution will be found to have a value less than or equal to X. In the case of a continuous distribution, it gives the area under the probability density function from minus infinity to x. The probability density function is a function that describes the relative likelihood for a random variable to take on a given value. FIG. 9A illustrates multiple CDFs, each CDF having a mean ($\mu$) and a variance ($\sigma^2$), with a standard deviation ($\sigma$) of the CDF being a square root of the variance. FIG. 9B illustrates multiple PDFs, each PDF having a mean ($\mu$) and a variance ($\sigma^2$), with a standard deviation ($\sigma$) of the PDF being a square root of the variance. Using the techniques described above, the device 102 may determine the mean and the variance of data points associated with the noise. As the variance is determined from data points associated with the noise, statistical methods may use the variance to distinguish signals included in data from noise fluctuations included in the data.

The CDFs and PDFs illustrated in FIGS. 9A-9B are simplified for ease of explanation to conceptually illustrate the relationship between the CDFs and the PDFs. Thus, the CDFs and PDFs are theoretical and idealized, being symmetric with a zero mean. In real world applications, the CDFs and PDFs may not be symmetric and/or may not have a mean that is exactly zero. For example, while sound waves propagating through air may have a zero mean, data captured by a microphone and/or transformations of the data may have a non-zero mean. In some examples, the device 102 may approximate the noise and estimate the mean as being exactly zero or assume that the distribution is symmetric around the mean. For example, the device 102 may assume a zero mean and symmetric distribution and estimate the variance based on this assumption. Additionally or alternatively, the device 102 may know the mean a priori and may assume that the distribution is symmetric around the mean.

In some examples, including when the noise distribution is asymmetric, the device 102 may estimate the mean or the median. The device 102 may predict that the mean or median of the noise will be non-zero based on the nature of the data being analyzed. For example, the data may be modified using an absolute value function or a square function (or square the absolute value function), which will result in positive values and a positive, non-zero mean. The device 102 may determine a number of runs for each threshold, from a lowest threshold to a highest threshold, and determine an estimated cumulative distribution function for the number of runs versus the threshold. The estimated CDF may include a cumulative sum of the number of runs, starting at the lowest threshold and ending at the highest threshold. In some examples, the device 102 may divide the estimated CDF by a total cumulative number of runs so that the estimated CDF spans from 0 to 1.

In some examples, the device 102 may smooth the data (e.g., smooth the data points included in the estimated CDF) prior to estimating the mean or median. For example, the device 102 may perform curve fitting (e.g., determine a line of best fit for the estimated CDF using a Gaussian distribution, a chi-squared distribution or the like) to smooth out some of the fluctuations in the estimated CDF and may determine the mean or median after curve fitting (e.g., from the line of best fit) instead of directly from the data included in the estimated CDF.

The device 102 may estimate a median of the noise based on a maximum number of runs. For example, the device 102 may determine an estimated probability distribution function of the number of runs as a function of the threshold by taking a derivative of the estimated CDF. The estimated PDF may be illustrated as a histogram with a value of the threshold as the x axis and a number of runs per threshold as the y axis. The peak of the estimated PDF corresponds to the median, which is the threshold having the maximum number of runs, and may correspond to where a derivative of the estimated PDF is zero. If the noise is symmetric, the median is equal to the mean. For asymmetric noise where the mean may be different from the median, the device 102 may estimate the mean based on the median or approximate the mean using the median.

The device 102 may determine a course estimate of the variance using a shape of the estimated PDF. For example, if the noise has a small variance, the shape of the estimated PDF will be tall and tightly centered around the mean, whereas if the noise has a large variance, the shape will be flatter and spaced further around the mean. The device 102 may determine the course estimate of the variance by finding where a derivative of the estimated PDF is minimum and maximum. For example, the device 102 may determine a first point corresponding to where the derivative of the estimated PDF is maximum (e.g., deepest upward angle) and a second point corresponding to where the derivative of the estimated PDF is minimum (e.g., deepest downward angle), the first point below the mean and the second point above the mean. In some examples, such as for a Gaussian distribution, the first point corresponds to one standard deviation below the mean and the second point corresponds to one standard deviation above the mean. In other examples, the device 102 may approximate a Gaussian distribution by associating the first point with one standard deviation below the mean and the second point with one standard deviation above the mean even when the device 102 does not know that the distribution is Gaussian. For example, the device 102 may determine a midpoint between the first point and the second point as the mean and may determine the standard deviation as the distance between the first point and the second point divided by two.

Figure 10:
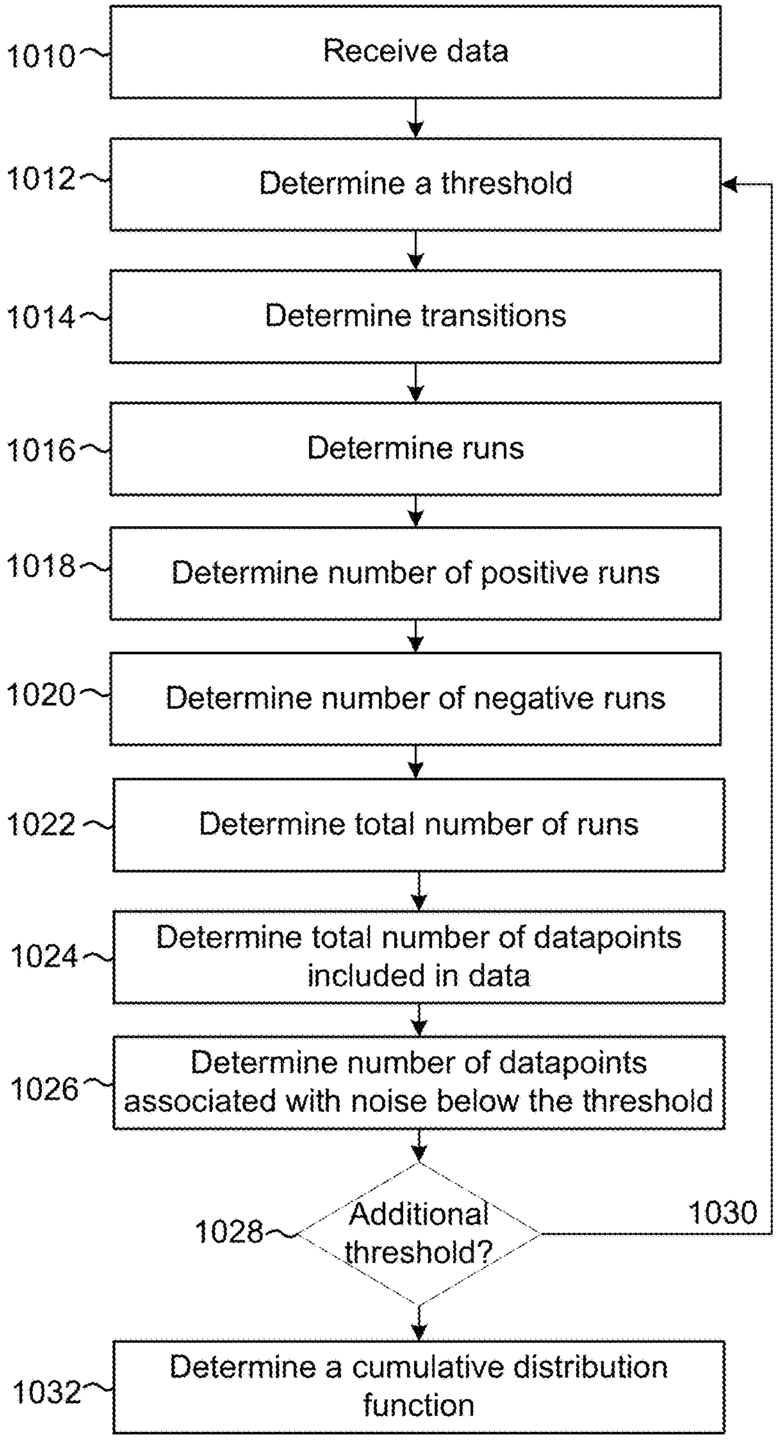
FIG. 10 is a flowchart conceptually illustrating an example method for determining a cumulative distribution function according to embodiments of the present disclosure.

FIG. 10 is a flowchart conceptually illustrating an example method for determining a cumulative distribution function according to embodiments of the present disclosure. The device 102 may receive (1010) data and may determine (1012) a threshold as discussed in greater detail above. The device 102 may determine (1014) transitions in the data, the transitions corresponding to where the data intersects the threshold. The device 102 may determine (1016) runs in the data, the runs corresponding to sequences of data points above or below the threshold. The device 102 may determine (1018) a number of positive runs and determine (1020) a number of negative runs. For example, the device 102 may determine how many runs include data points exceeding the threshold and may determine how many runs include data points below the threshold.

The device 102 may determine (1024) a total number of runs. The device 102 may then determine (1026) a total number of data points included in the data and determine (1028) a number of data points associated with noise below the threshold. For example, the total number of data points includes each data point in a particular time window, which may include every data point included in the data. The number of data points associated with noise below the threshold may be determined using equation 1 described above.

The device 102 may determine (1030) if there is an additional threshold. For example, the device 102 may sweep from a bottom to a top of a data range associated with a waveform in small increments, generating a threshold at each level. If there is an additional threshold (e.g., a threshold a small increment above the current threshold), the device 102 may loop (1032) to step 1012 and repeat steps 1012-1030. If there is no additional threshold (e.g., the current threshold is at the top of the data range), the device 102 may then determine (1030) a cumulative distribution function, for example using equation 2 described above. For example, the cumulative distribution function may be determined from the number of data points associated with noise below an individual threshold and the total number of runs associated with the individual threshold for a plurality of individual thresholds. The device 102 may then determine a variance associated with noise included in the data from the cumulative distribution function, as discussed in greater detail below with regard to FIGS. 11A-11B.

Figure 11A:
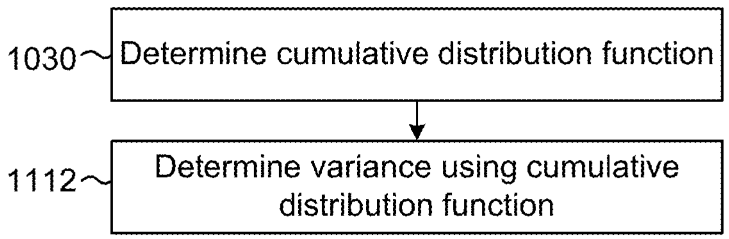
FIGS. 11A-11B are flowcharts conceptually illustrating example methods for determining a variance of the noise according to embodiments of the present disclosure.
Figure 11B:
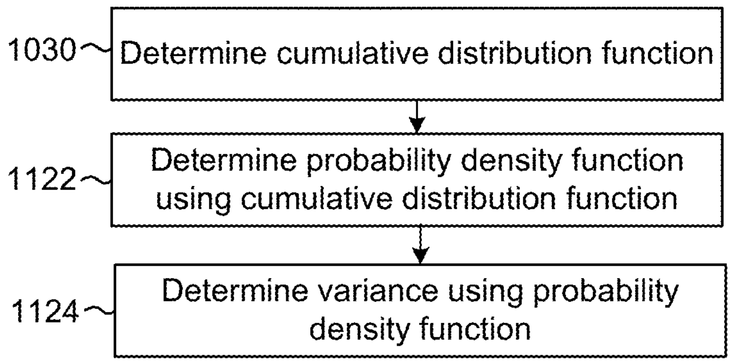

FIGS. 11A-11B are flowcharts conceptually illustrating example methods for determining a variance of the noise according to embodiments of the present disclosure. As illustrated in FIG. 11A, the device 102 may determine the variance of the noise from the cumulative distribution function. Thus, the device 102 may determine (1030) the cumulative distribution function as described above with regard to FIG. 10 and may determine (1112) a variance using the cumulative distribution function. For example, the device 102 may determine the variance using Equation 4:

$$2\int_0^\infty u(1-F(u))du-(\int_0^\infty 1-F(u)du)^2. \tag{4}$$

where F(u) is the cumulative distribution function. Equation 4 may be implemented using a discrete cumulative distribution function by replacing the integrals with sums. The device 102 may use the CDF and equation 4 to determine the variance in certain situations, such as when the noise approximates a Gaussian distribution. In addition, when the noise approximates a Gaussian distribution, the noise may be simulated using the variance alone. Therefore, in some examples the device 102 may simulate the noise using equation 4 and the CDF, without determining the PDF. However, in some examples the device 102 may need to determine the PDF to determine the variance (e.g., when the noise does not approximate a Gaussian distribution). In these situations, the device 102 may determine the PDF using equation 4 and then determine the variance and other noise characteristics from the PDF, as discussed below.

As illustrated in FIG. 11B, the device 102 may determine the variance of the noise by determining a probability density function. Thus, the device 102 may determine (1030) the cumulative distribution function as described above with regard to FIG. 10, may determine (1122) a probability density function as described above with regard to equation 3 and may determine (1124) a variance using multiple techniques. In some examples, such as when the noise approximates a Gaussian distribution, the device 102 may determine the variance using Equation 5:

$$\sigma^2 = \frac{1}{2\pi f_0^2} \tag{5}$$

where $f_0$ is the probability density function at the mean of the noise and $\sigma^2$ is the variance. In other examples, such as when the noise does not approximate a Gaussian distribution, the device 102 may determine the variance using Equation 6:

$$\mathrm{Var}(X)=\sigma^2=\int(x-\mu)^2 f(x)dx=\int x^2 f(x)dx-\mu^2 \tag{6}$$

where x is the variable, μ is the expected value (e.g., μ=∫( )), f(x) is the probability density function, and where the integrals are definite integrals taken for x ranging over the range of X.

As the noise characteristics, such as the variance, are determined from data points associated with the noise (e.g., not included in peaks associated with the signals), statistical methods may use the noise characteristics/variance to distinguish signals included in data from noise fluctuations included in the data. For example, the variance indicates how far the noise fluctuates from the mean. Therefore, the device 102 may estimate a range associated with the noise (e.g., range of noise fluctuations) and determine that data points exceeding the range are associated with signals instead of noise. In some examples (e.g., when the noise approximates a Gaussian distribution, although the disclosure is not limited thereto), the device 102 may use the variance and the mean to set a threshold, such as by setting the threshold a number of standard deviations (e.g., 1-2) above the mean. In other examples (e.g., when the noise does not approximate a Gaussian distribution), the device 102 may use the PDF to determine a particular threshold, such as by setting the threshold to a fixed percentile (e.g., 90th or 95th percentile). Thus, in some examples the device 102 may determine the threshold based on the variance while in other examples the device 102 may determine the threshold based on the PDF. Using the threshold, the device 102 may associate data points exceeding the threshold with signals and data points below the threshold with the noise.

Figure 12:
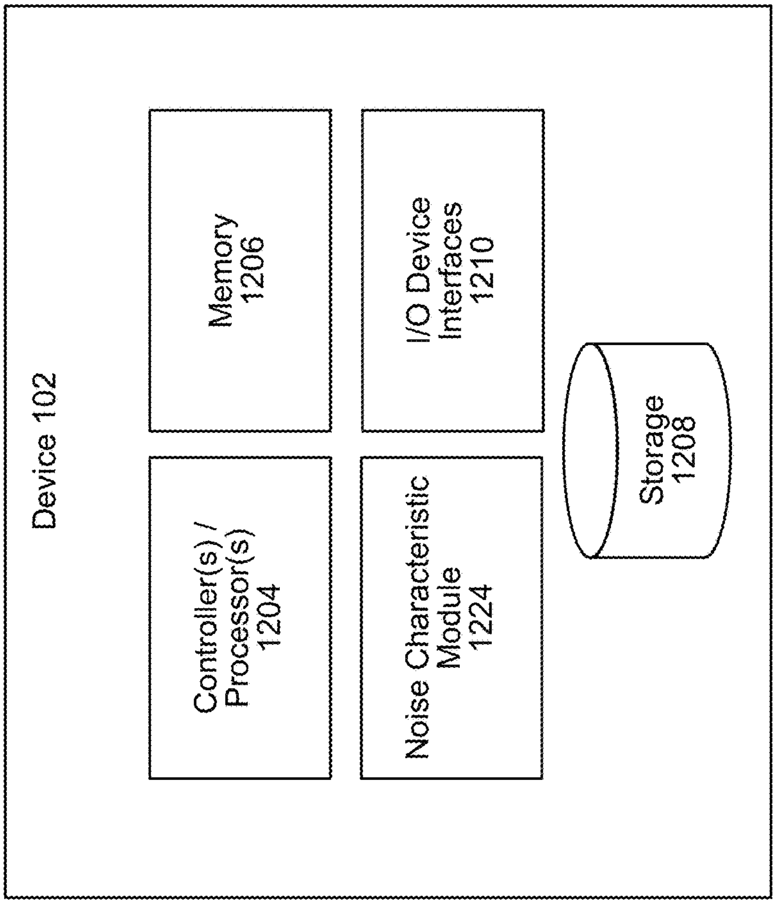
FIG. 12 is a block diagrams conceptually illustrating example components of a system according to embodiments of the present disclosure.

FIG. 12 illustrates a block diagram conceptually illustrating example components of a system 100 including a device 102. Other components not illustrated may also be included in the device 102. In operation, the system 100 may include computer-readable and computer-executable instructions that reside in storage 1208 on the device 102. The device 102 may be an electronic device capable of determining characteristics of noise included in data. Examples of electronic devices may include computers (e.g., a desktop, a laptop, a server or the like), portable devices (e.g., a smart phone, tablet or the like), media devices (e.g., televisions, video game consoles, set-top boxes, headless devices or the like) or the like. The device 102 may also be a component of any of the abovementioned devices or systems.

As illustrated in FIG. 12, the device 102 may include an address/data bus (not shown) for conveying data among components of the device 102. Each component within the device 102 may also be directly connected to other components in addition to (or instead of) being connected to other components across the bus.

The device 102 may include one or more controllers/processors 1204 comprising one-or-more central processing units (CPUs) for processing data and computer-readable instructions and a memory 1206 for storing data and instructions. The memory 1206 may include volatile random access memory (RAM), non-volatile read only memory (ROM), non-volatile magnetoresistive (MRAM) and/or other types of memory. The device 102 may also include a data storage component 1208 for storing data and processor-executable instructions. The data storage component 1208 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 1210.

The device 102 includes input/output device interfaces 1210. A variety of components may be connected to the device 102 through the input/output device interfaces 1210. The input/output device interfaces 1210 may be configured to operate with a network, for example a wireless local area network (WLAN) (such as WiFi), Bluetooth, zigbee and/or wireless networks, such as a Long Term Evolution (LTE) network, WiMAX network, 3G network, etc. The network may include a local or private network or may include a wide network such as the internet. Devices may be connected to the network through either wired or wireless connections.

The input/output device interfaces 1210 may also include an interface for an external peripheral device connection such as universal serial bus (USB), FireWire, Thunderbolt, Ethernet port or other connection protocol that may connect to networks. The input/output device interfaces 1210 may also include a connection to an antenna (not shown) to connect one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 further includes a noise characteristic module 1224, which may comprise processor-executable instructions stored in storage 1208 to be executed by controller(s)/processor(s) 1204 (e.g., software, firmware), hardware, or some combination thereof. For example, components of the noise characteristic module 1224 may be part of a software application running in the foreground and/or background on the device 102. The noise characteristic module 1224 may control the device 102 as discussed above, for example with regard to FIGS. 1, 10, 11A and/or 11B. Some or all of the controllers/modules of the noise characteristic module 1224 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like).

Executable computer instructions for operating the device 102 and its various components may be executed by the controller(s)/processor(s) 1204, using the memory 1206 as temporary "working" storage at runtime. The executable instructions may be stored in a non-transitory manner in non-volatile memory 1206, storage 1208, or an external device. Alternatively, some or all of the executable instructions may be embedded in hardware or firmware in addition to or instead of software.

The device 102 may further include the application module(s) 210, graphics library wrapper 212, graphics library 214 and/or graphics processor(s) 216 described in greater detail above with regard to FIGS. 2A-2B. The components of the device(s) 102 and server(s) 112, as illustrated in FIGS. 12A and 12B, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising: receiving first data, the first data comprising a sequence of data points; determining a total number of data points included in the first data; determining a first threshold;

determining, for the first threshold, a first plurality of runs in the sequence of data points, wherein a run in the first plurality of runs is associated with a transition corresponding to consecutive data points being above and below the first threshold; determining a second threshold;

determining, for the second threshold, a second plurality of runs in the sequence of data points, wherein a run in the second plurality of runs is associated with a transition corresponding to consecutive data points being above and below the second threshold;

determining a first value of a cumulative distribution function using a total number of the first plurality of runs;

determining a second value of the cumulative distribution function using a total number of the second plurality of runs;

determining the cumulative distribution function using the first value and the second value and;

estimating a noise variance using the first value and the second value of the cumulative distribution function.

2. The computer-implemented method of claim 1, wherein estimating the noise variance comprises determining values of a probability density function using the first value and the second value of the cumulative distribution function.

3. The computer-implemented method of claim 1, wherein determining the first value of the cumulative distribution function comprises solving a quadratic equation.

4. The computer-implemented method of claim 3, wherein the quadratic equation comprises $$\frac{1}{N}B^2 - B + \frac{\rho}{2} = 0$$

and wherein ρ corresponds to the total number of the first plurality of runs.

5. The computer-implemented method of claim 4, wherein determining the first value of the cumulative distribution function comprises dividing B by $2\rho_0$, wherein $\rho_0$ corresponds to a total number of runs corresponding to a third threshold.

6. The computer-implemented method of claim 5, wherein the third threshold corresponds to an estimate of the mean of noise included in the first waveform.

7. The computer-implemented method of claim 1, wherein determining the first plurality of runs comprises determining a first plurality of transitions, wherein each transition corresponds to a pair of adjacent data points wherein a first data point of the pair is above the threshold and a second data point of the pair is below the threshold.

8. A computer-implemented method, the method comprising:

receiving first data, the first data comprising a sequence of data points;

determining a total number of data points included in the first data;

determining a first threshold;

determining, for the first threshold, a first plurality of runs in the sequence of data points, wherein a run in the first plurality of runs is associated with a transition corresponding to consecutive data points being above and below the first threshold;

determining a second threshold;

determining, for the second threshold, a second plurality of runs in the sequence of data points, wherein a run in the second plurality of runs is associated with a transition corresponding to consecutive data points being above and below the second threshold;

determining a first value of a cumulative distribution function using a total number of the first plurality of runs;

determining a second value of the cumulative distribution function using a total number of the second plurality of runs; and determining the cumulative distribution function using the first value and the second value.

9. The computer-implemented method of claim 8, wherein determining the first plurality of runs further comprises:

determining, for the first threshold, the first plurality of runs in the sequence of data points, wherein a run in the first plurality of runs comprises a sequence of consecutive data points wherein (i) all data points in the run are above the first threshold and any data points adjacent to the run are below the first threshold, or (ii) all data points in the run are below the first threshold and any data points adjacent to the run are above the first threshold.

10. The computer-implemented method of claim 8, wherein estimating the noise variance comprises determining values of a probability density function using the first value and the second value of the cumulative distribution function.

11. The computer-implemented method of claim 10, further comprising:

determining an estimate of a mean of the noise using the probability density function, wherein the mean corresponds to a third threshold having a highest number of runs.

12. The computer-implemented method of claim 8, wherein determining the first value of the cumulative distribution function comprises solving a quadratic equation.

13. The computer-implemented method of claim 12, wherein the quadratic equation comprises $$\frac{1}{N}B^2 - B + \frac{\rho}{2} = 0$$

and wherein $\rho$ corresponds to the total number of the first plurality of runs.

14. The computer-implemented method of claim 13, wherein determining the first value of the cumulative distribution function comprises dividing B by $2\rho_0$, wherein $\rho_0$ corresponds to a total number of runs corresponding to a third threshold.

15. The computer-implemented method of claim 14, wherein the third threshold corresponds to an estimate of the mean of noise included in the first data.

16. The computer-implemented method of claim 8, wherein determining the first plurality of runs comprises determining a first plurality of transitions, wherein each transition corresponds to a pair of adjacent data points wherein a first data point of the pair is above the threshold and a second data point of the pair is below the threshold.

17. A device, comprising: at least one processor;

a memory device including instructions operable to be executed by the at least one processor to configure the device for:

receiving first data, the first data comprising a sequence of data points; determining a total number of data points included in the first data; determining a first threshold;

determining, for the first threshold, a first plurality of runs in the sequence of data points, wherein a run in the first plurality of runs is associated with a transition corresponding to consecutive data points being above and below the first threshold; determining a second threshold;

determining, for the second threshold, a second plurality of runs in the sequence of data points, wherein a run in the second plurality of runs is associated with a transition corresponding to consecutive data points being above and below the second threshold;

determining a first value of a cumulative distribution function using a total number of the first plurality of runs;

determining a second value of the cumulative distribution function using a total number of the second plurality of runs;

determining the cumulative distribution function using the first value and the second value; and estimating a noise variance using the first value and the second value of the cumulative distribution function.

18. The device of claim 17, wherein the instructions further configure the system for:

determining, for the first threshold, the first plurality of runs in the sequence of data points, wherein a run in the first plurality of runs comprises a sequence of consecutive data points wherein (i) all data points in the run are above the first threshold and any data points adjacent to the run are below the first threshold, or (ii) all data points in the run are below the first threshold and any data points adjacent to the run are above the first threshold.

19. The device of claim 17, wherein estimating the noise variance comprises determining values of a probability density function using the first value and the second value of the cumulative distribution function.

20. The device of claim 19, wherein the instructions further configure the system for:

determining an estimate of a mean of the noise using the probability density function, wherein the mean corresponds to a third threshold having a highest number of runs.

21. The device of claim 17, wherein determining the first value of the cumulative distribution function comprises solving a quadratic equation.

22. The device of claim 21, wherein the quadratic equation comprises $$\frac{1}{N}B^2 - B + \frac{\rho}{2} = 0$$

and wherein $\rho$ corresponds to the total number of the first plurality of runs.

23. The device of claim 22, wherein determining the first value of the cumulative distribution function comprises dividing B by $2\rho_0$, wherein $\rho_0$ corresponds to a total number of runs corresponding to a third threshold.

24. The device of claim 23, wherein the third threshold corresponds to an estimate of the mean of noise included in the first data.

25. The device of claim 17, wherein determining the first plurality of runs comprises determining a first plurality of transitions, wherein each transition corresponds to a pair of adjacent data points wherein a first data point of the pair is above the threshold and a second data point of the pair is below the threshold.

* * * * *